United States Patent Office 2,720,929
Patented Oct. 18, 1955

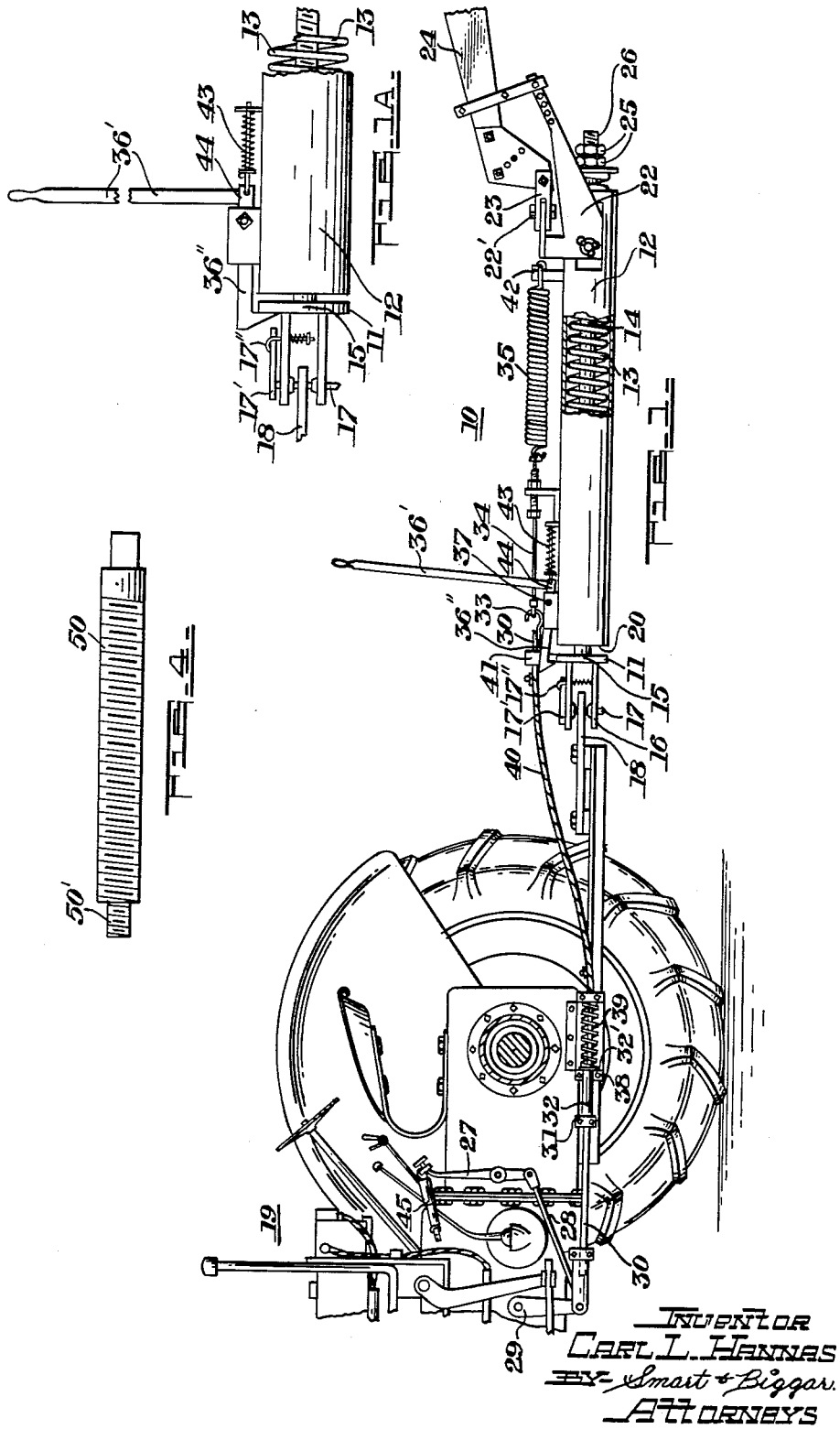

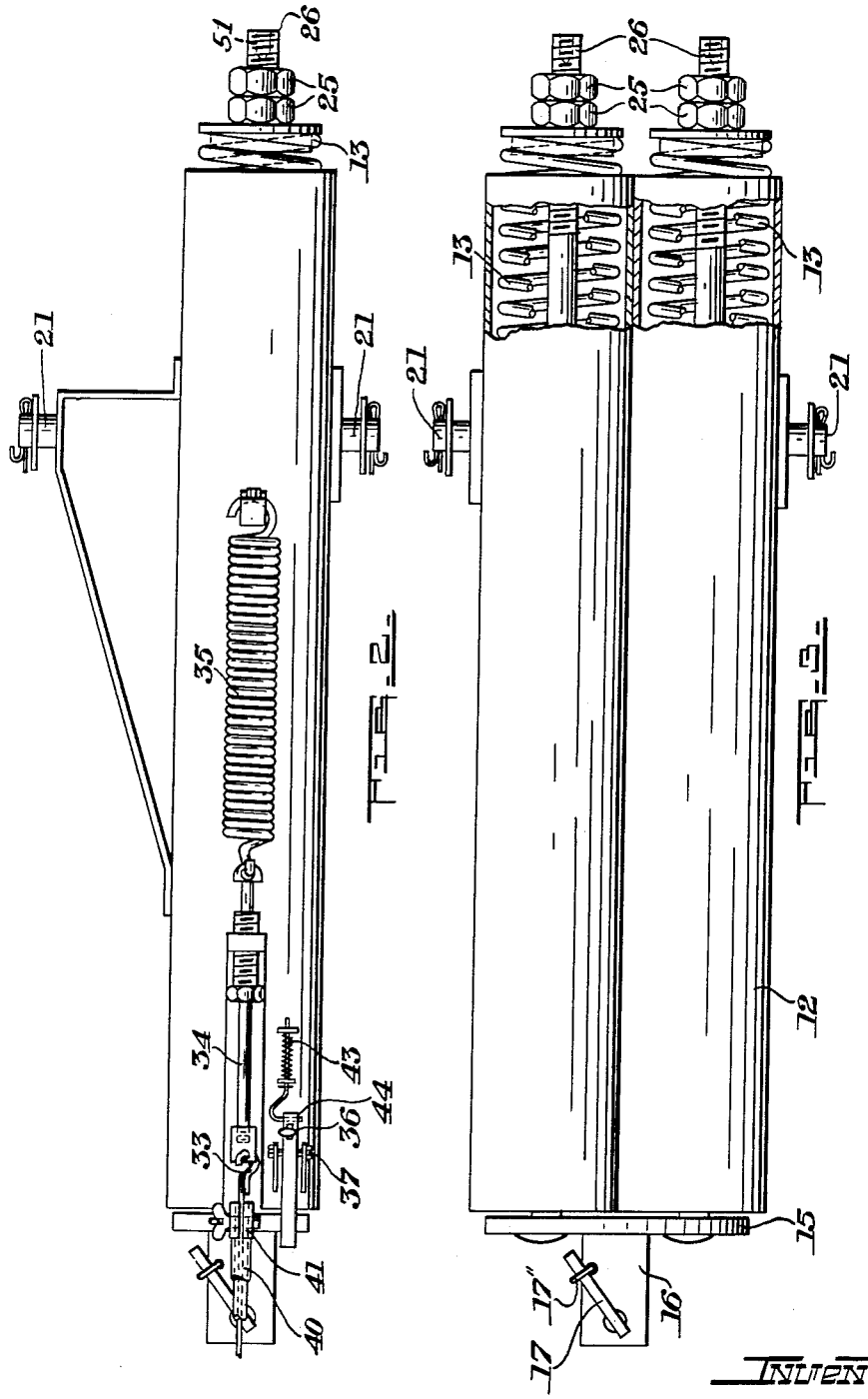

2,720,929

IMPLEMENT HITCH WITH PRESTRESSED SPRING YIELDABLE ON EXCESSIVE PULL TO DISENGAGE TRACTOR CLUTCH

Carl L. Hannas, Fort Kent, Alberta, Canada

Application June 11, 1951, Serial No. 230,937

Claims priority, application Canada August 29, 1950

2 Claims. (Cl. 180—14.5)

The invention relates to an implement hitch for a tractor and is concerned with the type having a draft spring and a connection for releasing the clutch of the tractor upon the implement striking an obstruction. The present patent application is a continuation-in-part of application Serial Number 194,247, filed November 6, 1950, now abandoned.

It is common for implement hitches to have a draft spring through which a tractor can exert force to pull an implement. The draft spring absorbs small shocks which the implement ordinarily transmits to the hitch and, often, the draft spring prevents the damaging of some part of the implement if the implement strikes an obstruction. However, if the obstruction is one that stops the implement, the tractor must be stopped as soon as possible to prevent damage to the hitch or to the implement.

Prior to the invention, it was common to have the hitch arranged so that it parted when the implement became lodged against a solid obstruction. With this arrangement, the tractor would become separated from the implement by a distance which depended upon how quickly the operator stopped the tractor after he realized the hitch had parted. Usually the tractor moved ahead several yards before being stopped making it necessary for the operator to reverse the tractor and manoeuvre it into a position in which the hitch could be reassembled. This difficulty was partly overcome by making a connection between the implement and the clutch of the tractor so that the clutch would be released automatically when the implement was stopped by an obstruction, and the operator would then be only responsible for reversing the tractor and reassembling the hitch. According to another improved prior art arrangement, the hitch included a telescopic shaft connection between the tractor and the implement so that the tractor and the implement did not become completely separated, and the operator did not have to reassemble the hitch by hand. However, with this arrangement, as in the other prior art arrangements, the operator had to reverse the tractor and manoeuvre it into a position in which the hitch could be reassembled.

In a hitch according to the present invention, the draft spring is maintained under sufficient compression to prevent any substantial amount of relative movement between the pulling member and the pulled member of the hitch during a normal load while allowing relative motion under an abnormal load due to, for example, the implement striking an obstruction. Means attached to the pulled member is connected to the clutch of the tractor to disengage the clutch when a given amount of relative movement has occurred and to allow re-engagement of the clutch when the relative movement has been compensated for. According to the invention, it is preferred that the draft spring be a coil spring which is compressed to about one half its unstressed length when under sufficient tension to prevent relative movement between the pulling member and the pulled member upon application of a normal load to the hitch.

In a preferred embodiment of the invention, the pulling member is a rod located within a draft coil spring through which the pulling member can transmit pulling force to a concentric tubular pulled member which is in telescopic relation to the pulling member. The pulled member has an abutment against which the draft spring acts to transmit pulling force to the implement. A flexible cable adapted to be connected to the clutch of the tractor is resiliently attached to the pulled member so that a given amount of movement of the pulled member relative to the pulling member would cause the clutch of the tractor to be disengaged.

It is a feature of the present invention that the draft spring is maintained under sufficient tension at all times to transmit a normal pulling force without the draft spring assuming further tension. Provision is made for placing the draft spring under the required amount of tension by providing a detachable extension for the pulling member.

In one form of the invention, a pair of draft springs is provided so that the pulling force can be divided equally between them.

The invention provides means for locking the pulling member to the pulled member as is desirable under certain conditions, for example, when the implement encounters an obstruction which would, as explained above, release the clutch of the tractor but which is one through which the implement must be pulled. Examples of such obstructions are a soft patch of ground into which the implement sinks, or a patch of tough roots through which the implement must be pulled.

When an implement is drawn by a hitch according to the invention, and the implement strikes an obstruction causing an abnormal force to be transmitted to the hitch, a considerable amount of relative motion occurs between the pulling member and the pulled member, resulting in disengagement of the clutch of the tractor. As the relative motion occurs between the pulling member and the pulled member, the tractor moves forward and the implement remains stationary, causing a greater than normal compression in the draft spring which reacts through the implement and against the obstruction thereby stopping the tractor. According to the invention, the pressure between the implement and the obstruction is automatically reduced due to the clutch of the tractor being disengaged and the greater than normal tension in the draft spring causing the tractor to move backwards. The backwards movement of the tractor is stopped by engagement between the pulling member and the pulled member and the resulting shock transmitted to the implement loosens it from the obstruction so that the operator of the tractor is able to make the usual adjustments of the implement to release it from the obstruction. When the tractor comes to rest, the clutch of the tractor is automatically re-engaged and the implement may be again drawn in a normal manner. Use of a hitch according to the invention results in the important advantage that the operator of the tractor is relieved of the requirement to reverse the tractor and to manoeuvre it to a particular position.

The invention will be further described with respect to the attached drawings in which certain embodiments of the invention are shown and in which:

Figure 1 is a side view, partly in section, of a hitch according to the invention shown in an operative position;

Figure 1a is a partial side view of a hitch as shown in Figure 1, showing the pulling and pulled members locked together;

Figure 2 is a plan view of the hitch shown in Figure 1;

Figure 3 is a plan view of the hitch according to the invention and having a pair of draft springs; and Figure 4 is a view of an extension for the pulled member of a hitch according to the invention.

As shown in Figures 1 and 2, a hitch 10 according to the invention comprises a pulling member 11, a pulled member 12 and a draft spring 13. The pulling member 11 comprises a draft rod 14 extending through the draft spring 13 and welded into a head 15 which forms a clevis 16 attached by a pin 17 to the drawbar 18 of a tractor 19. The pin 17 is secured in position by having its head 17′ held down by a spring loaded hook 17″. The pulled member 12 extends over the draft spring 13 in a telescopic arrangement and has an abutment 20 for the draft spring 13. The pulled member 12 has horizontally extending shafts 21 to which a clevis 22 is pivotally attached. The clevis 22 provides means for a draft connection 22′ to the drawbar 23 of an implement 24, for example, a plow. The clevis 22 also provides a guiding connection 22″ to the implement 24. The draft spring 13 is held under tension against the abutment 20 by a pair of nuts 25 threaded onto the threaded end 26 of the draft rod 14.

As shown in Figure 1, there is a connection between the clutch pedal 27 of the tractor 19 and the pulled member 12. This connection comprises a pitman 28, a swing arm 29, a flexible cable 30, a clamp 31, a tension applying member 32, a hook 33, a rod 34, and a coil spring 35. The swing arm 29 is pivoted to the tractor 19 and supports the conection between the pitman 28 and the cable 30. The member 32 is hollow and has a flange 32′ which abuts a guide bearing member 38 and is urged against the clamp 31 by a coil spring 39. The flexible cable 30 is enclosed in a flexible casing 40 clamped at its ends to the guide 38 and to a guide 41 on the pulling member 11. The spring 35 is hooked to an anchor member 42 on the pulled member 12. As shown in Figure 1, a shock absorber 45 is connected between the body of the tractor 19 and the clutch pedal 27.

The draft spring 13, as shown in Figure 1, is under sufficient compression to pull the implement 24 without occurrence of any substantial amount of relative motion between the pulling member 11 and the pulled member 12. The draft spring 13 is put under this amount of tension by attaching a draft rod extension 50 (Figure 4) to the end of draft rod 14. The extension 50 has a threaded part 50′ adapted to thread into the hollow internally threaded end 51 of the draft rod 14 (see Figure 2). With the extension 50 threaded into the draft rod 14, a nut 25 can be used to compress the draft spring from its zero tension length to the length at which it can assume the load presented by the implement 24 without any substantial amount of further compression. When the required amount of tension has been created in the spring 13, the spring will not extend past the draft rod 14, and the extension 50 can be removed. A second nut 25 is then threaded onto the draft rod 14 to lock the first nut 25 in its place.

As shown in Figures 1, 1a and 2, a bell-crank lever 36 having a vertical arm 36′ and a horizontal arm 36″ is pivoted to the pulled member 12 by a pivot 37. The horizontal arm 36″ is hooked so that with the lever 36 in its forward position (Figure 1a) the pulling member 11 is locked to the pulled member 12 and, under this condition, the hitch acts as a solid connection between the tractor 19 and the implement 24. As shown in Figure 1, the lever 36 is moved back to its release position and the pulling force of the tractor is transmitted through the draft spring 13. A spring 43 connected between the heel 44 of the lever 36 and the pulled member 12 holds the lever 36 in either of its positions.

The embodiment of the invention illustrated by Figure 3 is, in general, similar to the one described above except that two draft springs 13 and two draft rods 14 are provided. The reference numerals used for the parts shown in Figure 3 are the same as the reference numerals used for corresponding parts in Figures 1 and 2. The embodiment shown in Figure 3 has the advantage that the load is divided between two draft springs and therefore a hitch according to this embodiment can have a greater capacity.

In operation, the hitch 10 transmits pulling force from the tractor 19 to the implement 24 without any substantial amount of relative motion between the pulling member 11 and the pulled member 12 owing to the draftspring 13 being pre-tensioned as described above. However, if the implement 24 becomes lodged against an obstruction, for example a stone, the draft spring 13 is compressed further due to the abnormal load applied to it. Compression of the draft spring 13 is accompanied by relative movement between the pulling member 11 and the pulled member 12 and a forward movement of the tractor 19. The relative movement between the members 11 and 12 causes force to be applied to the spring 35 which in turn pulls on the flexible cable 30. The force is transmitted by the flexible cable 30 and through the pitman 28 to the clutch pedal 27 of the tractor 19. If the force transmitted to the clutch pedal 27 is sufficient, as is the case when the implement 24 is stopped by the obstruction, the clutch of the tractor 19 is disengaged, and the tractor stops after some further compression of the draft spring 13. When the tractor 19 stops, its clutch is still disengaged, and the tractor 19 is then pulled backwards by the force applied to its drawbar 18 by the draft spring 13. The draft spring 13 is able to pull the tractor backwards due to it being under abnormal tension, and due to the pulled member 12 being anchored to the obstruction by the implement 24.

The backward movement of the tractor 19 is stopped by the head 15 of the pulling member 11 striking the pulled member 12, and the resultant jarring of the implement 24 loosens it from the obstruction. As the tractor 19 moves backwards, the operator adjusts the control levers of the implement to free the implement from the obstruction. For example, if the implement is a plow and the obstruction is a stone, the operator raises the plow shares to clear the stone. When the tractor has moved back to a position such that the pulling member 11 and the pulled member 12 are again in their normal relative positions, tension is removed from the cable 30 and the spring 39 takes up the slack from the cable 33 so that the clutch pedal 27 can move into a position to re-engage the clutch. The shock absorber 45 acts to cause the clutch to be re-engaged slowly so that the tractor 19 will move forward smoothly as though the clutch had been slowly re-engaged by hand. The spring 35 is made strong enough to transmit enough force to disengage the clutch of the tractor 19 without expanding, but it will expand if further pull is applied after the clutch is disengaged.

It is important that the draft spring 13 be designed so that it compresses a considerable amount when the implement 24 strikes an obstruction. This will be so if the draft spring 13 is compressed an amount equal to approximately one half its unstressed length when compressed sufficiently to pull the implement 24 without any substantial amount of further compression. For example, the unstressed length of the draft spring 13 may be 60 inches; its length, when compressed for pulling the implement 24 as shown in Figure 1, may be about 30 or 40 inches; and its length when further compressed due to the implement striking an obstruction may be about 15 or 20 inches.

If the obstruction is of a type through which the implement 24 must be pulled, for example, a soft patch of ground or a patch of roots, the tractor 19 is moved backward to relieve the tension between it and the pulling member 11 and the lever 36 is manually pulled forward to the position shown in Figure 1a to lock the pulling member 11 to the pulled member 12 so that the hitch acts as a solid connection between the tractor 19 and the implement 24. When the implement 24 has been drawn through the obstruction, the lever 36 is moved to the position shown in Figure 1 and the pulling force is again transmitted through the draft spring 13.

What I claim as my invention is:

1. A non-separating implement hitch for a tractor, comprising a pulling member having tractor connection means, a pulled member having implement connection means, one of said members being rodlike, the other of said members being tubelike and arranged to abut the rodlike member in an axial direction in telescopic relation thereto, a draft coil spring located inside said tubelike member and being subjected to compressive stress between said members when said pulled member is under load, said spring being prestressed so as to urge the tubelike member into abutment with the rodlike member, said spring in prestressed state being at about one-half of its unstressed length and being of such a strength when prestressed as substantially to prevent relative motion between the rodlike member and the tubelike member while transmitting the force normally required to pull an implement, but adapted to allow such relative motion if said force becomes abnormally large; means attached to the pulled member and adapted to be resiliently connected to the clutch of the tractor to disengage said clutch when a given amount of relative motion has occurred, said given amount of relative motion being less than that required for the spring to reach its solid height the stressed spring having sufficient strength when said given amount of relative motion has occurred to cause the tractor to be pulled rearwardly to return the rod and tubelike member to their normal positions.

2. A non-separating implement hitch for a tractor comprising, a pulling member having tractor connection means, a pulled member having implement connection means, said pulled member being tubelike, said pulling member being rodlike, located inside said pulled member in generally telescoping relation and being capable of relative motion with respect to said pulled member; the end of said pulled member remote from the implement connection means having an abutment on its inner surface, the end of the pulling member remote from the tractor connection means having an adjustable abutment; a coil spring located inside said pulled member and compressed tightly between the abutment of the pulled member and the adjustable abutment of the pulling member; whereby under normal load no substantial amount of relative movement occurs between the pulling member and the pulled member, due to the compressed state of said spring, means attached to the pulled member, said last mentioned means adapted to be resiliently connected to the clutch of the tractor to disengage said clutch when a given amount of relative motion has taken place, said given amount of relative motion being less than that required for said coil spring to reach its solid height, said coil spring being capable of causing a tractor to be drawn rearwardly upon its clutch being disengaged by said means attached to said pulled member, whereby an implement attached to said pulled member could be more easily dislodged from an obstruction without the necessity of shifting gears on said tractor.

References Cited in the file of this patent

UNITED STATES PATENTS

| | | |
|---|---|---|
| 1,269,651 | Shankland | June 18, 1918 |
| 1,323,634 | Kagay | Dec. 2, 1919 |
| 1,391,422 | Solomon | Sept. 20, 1921 |
| 1,872,106 | Bolen | Aug. 16, 1932 |
| 1,966,679 | Paul | July 17, 1934 |
| 1,990,328 | Jett | Feb. 5, 1935 |
| 2,133,195 | Howard | Oct. 11, 1938 |
| 2,151,207 | Hilde | Mar. 21, 1939 |
| 2,287,516 | Endres | June 23, 1942 |
| 2,551,457 | Oerman | May 1, 1951 |

FOREIGN PATENTS

| | | |
|---|---|---|
| 199,530 | Great Britain | June 28, 1923 |